US011825195B2

(12) United States Patent
Takao

(10) Patent No.: US 11,825,195 B2
(45) Date of Patent: Nov. 21, 2023

(54) IMAGE CAPTURING APPARATUS USING INFORMATION RELATING TO A SHAPE OF THE REFLECTIVE OPTICAL SYSTEM, METHOD OF CONTROLLING THE SAME, AND STORAGE MEDIUM

(71) Applicant: CANON KABUSHIKI KAISHA, Tokyo (JP)

(72) Inventor: Yumi Takao, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 109 days.

(21) Appl. No.: 17/540,481

(22) Filed: Dec. 2, 2021

(65) Prior Publication Data
US 2022/0094841 A1   Mar. 24, 2022

Related U.S. Application Data

(63) Continuation of application No. PCT/JP2020/020992, filed on May 27, 2020.

(30) Foreign Application Priority Data

Jun. 5, 2019   (JP) ................. 2019-105607

(51) Int. Cl.
*H04N 23/67* (2023.01)
*G02B 7/09* (2021.01)
*H04N 23/55* (2023.01)

(52) U.S. Cl.
CPC ............... *H04N 23/67* (2023.01); *G02B 7/09* (2013.01); *H04N 23/55* (2023.01)

(58) Field of Classification Search
CPC ........ H04N 23/67; H04N 23/55; H04N 23/75; H04N 23/673; G02B 7/09; G02B 7/365; G03B 13/36; G03B 19/02
See application file for complete search history.

(56) References Cited

U.S. PATENT DOCUMENTS 5,841,574 A   11/1998 Willey
9,933,604 B1*  4/2018 Lu .................. G02B 17/0808
(Continued)

FOREIGN PATENT DOCUMENTS

CN   104062746 A   9/2014
JP   53-042638 U1  4/1978
(Continued)

OTHER PUBLICATIONS

The US Patent and Foreign Patents 1-2 and 5 were cited in the International Search Report dated Sep. 1, 2020 of International Application No. PCT/JP2020/020992.

*Primary Examiner* — Padma Haliyur
(74) *Attorney, Agent, or Firm* — Cowan, Liebowitz & Latman, P.C.

(57) ABSTRACT

An image capturing apparatus comprises an image sensor and a focus detection unit configured to, based on an image signal obtained by the image sensor while performing a scan operation that causes a focus lens to move along an optical axis of the imaging optical system, calculate a focus evaluation value and detect a position of the focus lens at which the focus evaluation value is a maximum, wherein the focus detection unit, in a case where the imaging optical system includes a reflective optical system in which a part of a light beam is blocked, sets a calculation method of the focus evaluation value or a control method of the focus lens during the scan operation based on information relating to a shape of the reflective optical system.

16 Claims, 13 Drawing Sheets

(56) References Cited

U.S. PATENT DOCUMENTS

| | | | |
|---|---|---|---|
| 11,082,604 B2* | 8/2021 | Takao | G02B 7/38 |
| 2010/0328783 A1* | 12/2010 | Wada | G02B 15/144113 |
| | | | 359/686 |
| 2013/0113986 A1* | 5/2013 | Chan | H04N 23/673 |
| | | | 348/E5.045 |
| 2013/0169857 A1* | 7/2013 | Christo | H04N 23/67 |
| | | | 348/349 |
| 2014/0036134 A1* | 2/2014 | Miyatani | H04N 23/672 |
| | | | 348/345 |
| 2015/0373263 A1* | 12/2015 | Georgiev | G06T 3/4038 |
| | | | 348/218.1 |
| 2016/0173760 A1* | 6/2016 | Kudo | H04N 23/673 |
| | | | 348/353 |

FOREIGN PATENT DOCUMENTS

| | | |
|---|---|---|
| JP | 07-222059 A | 8/1995 |
| JP | 2004-085725 A | 3/2004 |
| JP | 2010-078810 A | 4/2010 |

\* cited by examiner

OPENING DIAMETER D1[m]

OPENING DIAMETER D2[m]

OUTER DIAMETER DG[m]

INNER DIAMETER DN[m]

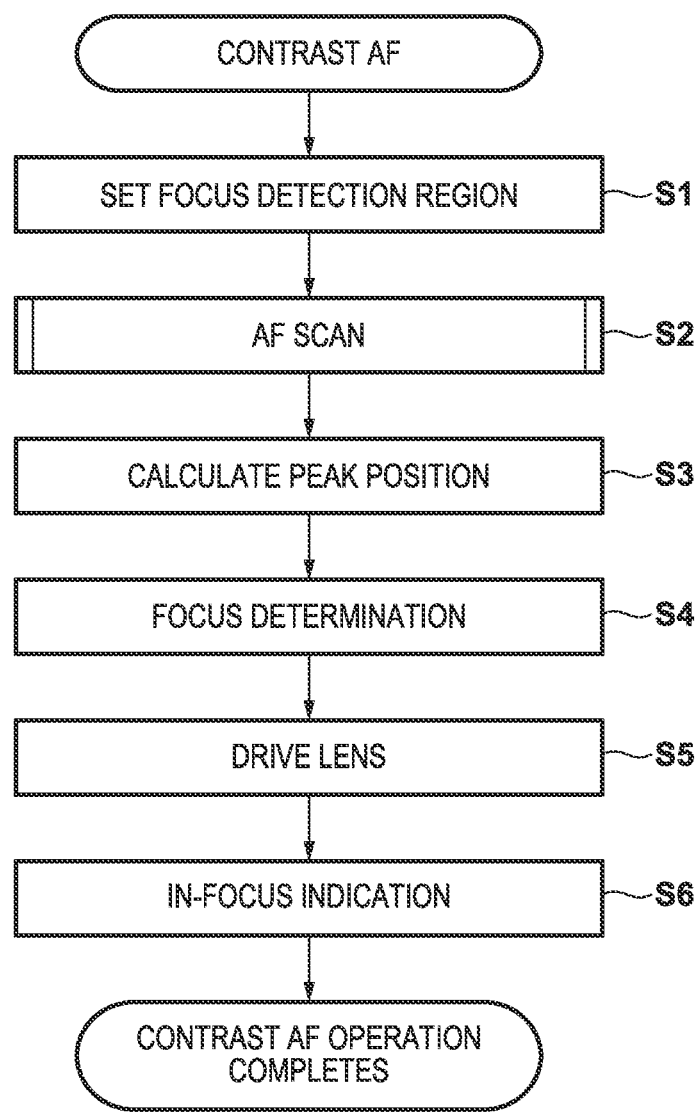

FIG. 13

| CAPTURING F VALUE | Filter TO BE SELECTED | | | |
|---|---|---|---|---|
| | NORMAL LENS | | LENS HAVING REFLECTIVE OPTICAL SYSTEM (OUTER DIAMETER F2, INNER/OUTER DIAMETER DIFFERENCE F4) | |
| | TIME OF COARSE SCAN | TIME OF FINE SCAN | TIME OF COARSE SCAN | TIME OF FINE SCAN |
| ~1.4 | 2 | 3 | | |
| 2.0 | 2 | 3 | | |
| 2.8 | 1 | 2 | | |
| 4.0 | 1 | 2 | 1 | 3 |
| 5.6 | 1 | 1 | | |
| 8.0~ | 1 | 1 | | |

IMAGE CAPTURING APPARATUS USING INFORMATION RELATING TO A SHAPE OF THE REFLECTIVE OPTICAL SYSTEM, METHOD OF CONTROLLING THE SAME, AND STORAGE MEDIUM

CROSS-REFERENCE TO RELATED APPLICATION(S)

This application is a continuation of International Patent Application No. PCT/JP2020/020992 filed on May 27, 2020, which claims priority to and the benefit of Japanese Patent Application No. 2019-105607 filed on Jun. 5, 2019, the entire disclosures of which are incorporated herein by reference.

BACKGROUND OF THE INVENTION

Field of the Invention

The present invention relates to a focus adjustment technique in an image capturing apparatus.

Description of the Related Art

In recent years, an optical system that is a miniaturized imaging lens with a long focal length on the optical axis of which a reflecting mirror is disposed has been proposed (see Japanese Patent Laid-Open No. 2004-85725). In the imaging optical system disclosed in Japanese Patent Laid-Open No. 2004-85725, an imaging lens capable of capturing at a high magnification is realized by internally reflecting light using a reflecting mirror, which enables a long focal length while having a small outer shape.

However, the image capturing apparatus described in the above patent document has the following problems.

In an imaging optical system such as that disclosed in Japanese Patent Laid-Open No. 2004-85725, due to the presence of a reflective optical system in which there is internal reflection, change in accordance with a focal position in an MTF (Modulation Transfer Function), which is an absolute value of an optical transfer function (OTF) indicating a resolution of an imaging lens, differs from change in a normal imaging lens. Therefore, with the same focus detection control as that of a normal imaging lens, focus detection accuracy is lower.

SUMMARY OF THE INVENTION

The present invention has been made in view of the above-mentioned problems, and improves the accuracy of focus detection in an image capturing apparatus that uses an imaging lens having a reflective optical system.

According to a first aspect of the present invention, there is provided an image capturing apparatus, comprising: an image sensor configured to capture a subject image; and at least one processor or circuit configured to function as a focus detection unit configured to, based on an image signal obtained by photoelectrically converting the subject image in accordance with the image sensor while performing a scan operation that causes a focus lens included in an imaging optical system to move along an optical axis of the imaging optical system, calculate a focus evaluation value indicating a degree of focus of a subject and detect a position of the focus lens at which the focus evaluation value is a maximum, wherein the focus detection unit, in a case where the imaging optical system includes a reflective optical system in which a part of a light beam is blocked, sets a calculation method of the focus evaluation value or a control method of the focus lens during the scan operation based on information relating to a shape of the reflective optical system.

According to a second aspect of the present invention, there is provided a method of controlling an image capturing apparatus having an image sensor configured to capture a subject image, the method comprising: based on an image signal obtained by photoelectrically converting the subject image in accordance with the image sensor while performing a scan operation that causes a focus lens included in an imaging optical system to move along an optical axis of the imaging optical system, calculating a focus evaluation value indicating a degree of focus of a subject and detecting a position of the focus lens at which the focus evaluation value is a maximum, wherein in the detecting, in a case where the imaging optical system includes a reflective optical system in which a part of a light beam is blocked, a calculation method of the focus evaluation value or a control method of the focus lens during the scan operation is set based on information relating to a shape of the reflective optical system.

Further features of the present invention will become apparent from the following description of exemplary embodiments with reference to the attached drawings.

BRIEF DESCRIPTION OF THE DRAWINGS

FIGS. 6A and 6B are flowcharts for describing a focus detection operation.

FIG. 13 is a diagram for describing focus detection frequency settings.

DESCRIPTION OF THE EMBODIMENTS

Figure 1A:
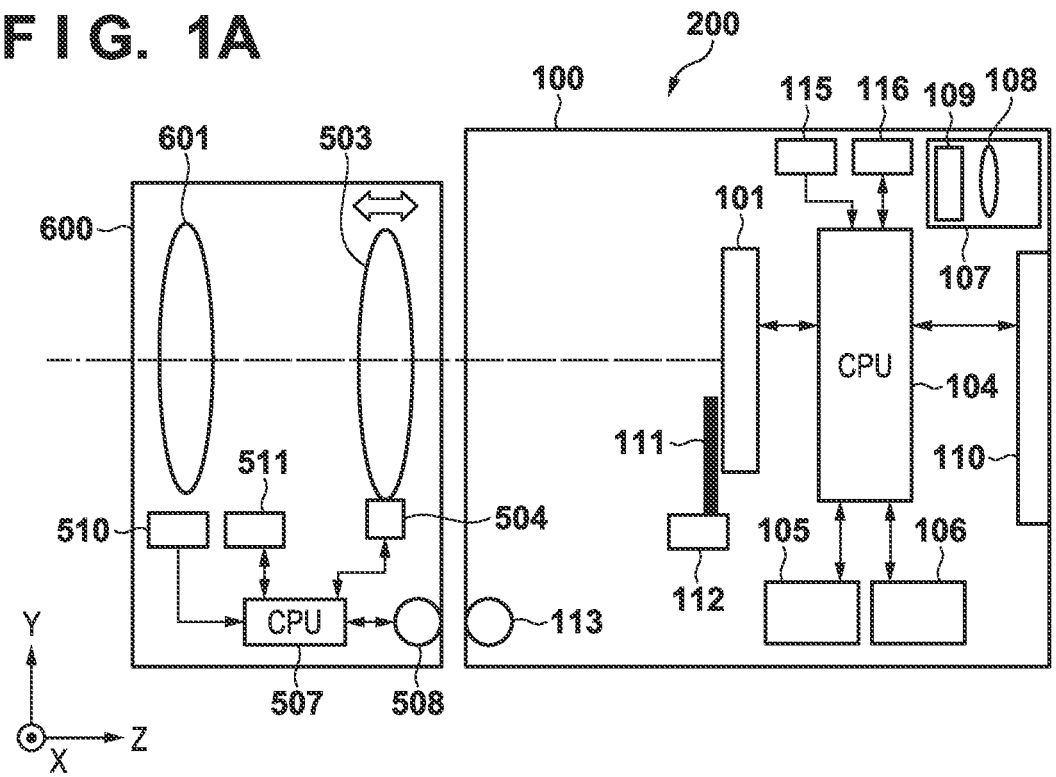
FIGS. 1A and 1B are diagrams showing a configuration of an interchangeable lens type digital camera system which is an embodiment of an image capturing apparatus of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Configuration of Image Capturing Apparatus

Figure 1B:
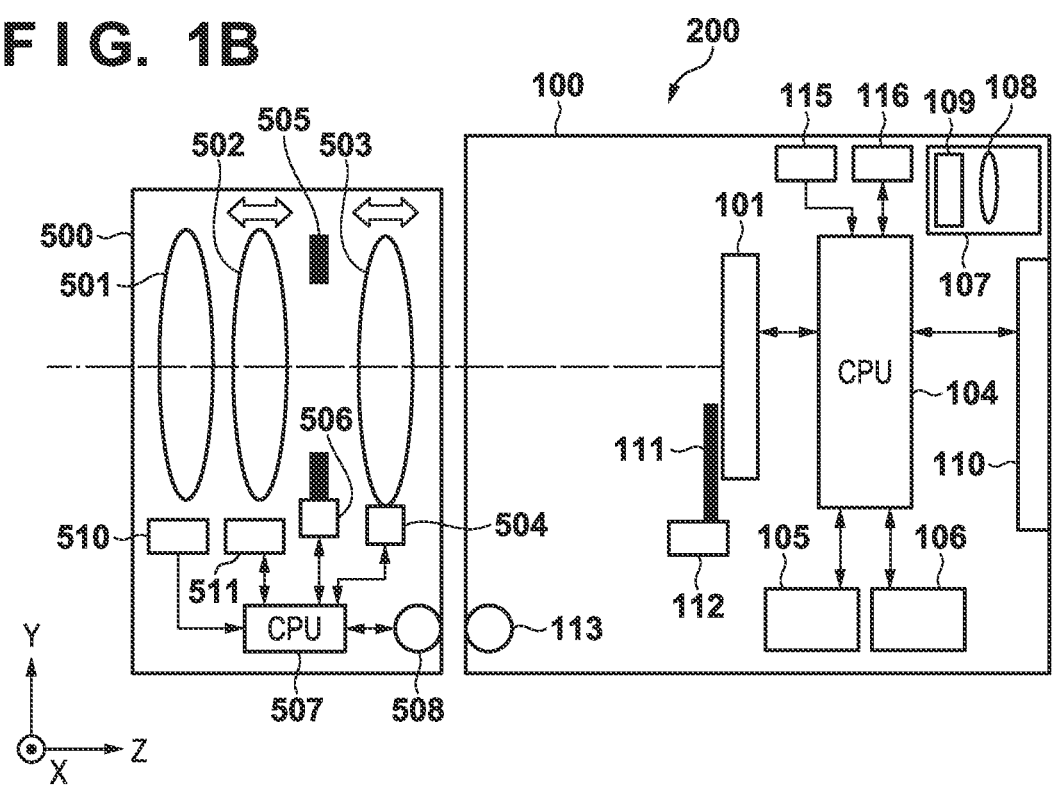

FIGS. 1A and 1B are diagrams showing a configuration of an interchangeable lens type digital camera system 200 which is an embodiment of an image capturing apparatus of the present invention. The digital camera system 200 is configured by having a camera body 100, and an imaging lens 500 or an imaging lens 600, for example, which are mounted on the camera body 100 in an interchangeable manner. FIG. 1A shows a state in which the imaging lens 600 which has a reflective optical system is mounted on the camera body 100, and FIG. 1B shows a state in which the imaging lens 500 which is normal (does not have a reflective optical system) is mounted on the camera body 100.

The imaging lens 500 and the imaging lens 600 are different types of lenses that are mounted interchangeably with respect to the camera body 100. A light beam transmitted through each lens group in the imaging lens 500 (or 600) is guided to the image sensor 101 that receives the subject image and performs photoelectric conversion. The image sensor 101 is configured by including pixel portions arranged in a matrix for converting a subject image into an electric signal. A pixel signal obtained by converting a subject image into an electric signal by the image sensor 101 is, in the camera CPU 104, subjected to various correction processes for obtaining an image signal and a focus detection signal, processes for converting the pixel signal into a live view image, a recorded image, or an EVF image, and the like. In the present embodiment, these processes and the like are performed by the camera CPU 104, but configuration may be taken such that a dedicated circuit is provided, and these processes are performed by this circuit.

An operation member 105 is various members for setting an imaging mode and image capturing conditions of the camera (such as the F value, ISO sensitivity, and exposure time). A storage medium 106 is a flash memory, and is a medium for recording a captured still image or a moving image. An in-viewfinder display 107 is configured by being provided with a small and high-definition display 109 such as an organic EL display or a liquid crystal display, and an eyepiece 108. An external display 110 is configured by an organic EL display or a liquid crystal display having a screen size suitable for being viewed with the naked eye. Various types of information such as the setting state of the camera body 100, the live view image, and the captured image are displayed on the in-viewfinder display 107 and the external display 110.

A focal plane shutter 111 is disposed on a front surface of the image sensor 101. A shutter driving unit 112 is, for example, a motor, and controls an exposure time for a time of capturing a still image by driving and controlling blades of the shutter. A camera-side communication terminal 113 is provided in a camera mount part for mounting the imaging lens 500 (or 600). The camera-side communication terminal 113 and a lens-side communication terminal 508 provided in the lens mount part are connected to each other, thereby enabling communication between the camera CPU 104 and a later-described lens CPU 507.

The camera CPU 104 is connected to a nonvolatile memory 115 comprising a ROM or the like and a volatile memory 116 comprising a RAM or the like. The camera CPU 104 deploys a program stored in the nonvolatile memory 115 into the volatile memory 116 and executes the program to thereby control the entire digital camera system 200. The nonvolatile memory 115 also stores various types of information for operations other than programs, information on characteristics of a plurality of types of imaging lenses, and the like.

The imaging lens 500 (or 600) is detachable in relation to the camera body 100, and in FIG. 1A, the imaging lens 600 which has a reflective optical system is shown, and in FIG. 1B, the imaging lens 500 which is a zoom lens having a variable focal length is shown. The type of the lens mounted on the camera body 100 is not relevant.

A light beam from a subject passes through the first lens group 501 or 601, the second lens group 502 (only in FIG. 1B), and the third lens group 503, and is formed as a subject image on the image capturing surface of the image sensor 101 in the camera body 100. The first lens group 601 is a lens group having a reflective optical system which is a characteristic of the present embodiment. A detailed configuration will be described later.

The second lens group 502 functions as a variator (variable magnification lens) for performing magnification variation by advancing and retracting in the optical axis direction. The third lens group 503 functions as a focus lens for performing focus adjustment by advancing and retracting in the optical axis direction. The third lens group 503 is driven by a focus driving unit 504 which uses a stepping motor or the like.

The aperture 505 existing only in FIG. 1B is configured by a plurality of aperture blades for adjusting the amount of light entering the imaging lens. An aperture driving unit 506 narrows and drives the aperture blades until a predetermined capturing F value is obtained. In the reflective optical system of FIG. 1A, since it is difficult to install an aperture mechanism composed of an aperture and an aperture driving unit, an aperture mechanism is not present, and in principle usage is performed only with an open F value. The lens CPU 507 communicates with the camera CPU 104 via the lens-side communication terminal 508 and the camera-side communication terminal 113, transmits and receives various kinds of information, and drives and controls the focus driving unit 504 and the aperture driving unit 506 based on commands from the camera CPU 104.

The lens CPU 507 is connected to a nonvolatile memory 510 comprising a ROM or the like and a volatile memory 511 comprising a RAM or the like. The lens CPU 507 deploys a program stored in the nonvolatile memory 510 into the volatile memory 511 and executes the program to thereby control the entire imaging lens 500 (or 600). The nonvolatile memory 510 also stores, for example, identification numbers and optical information unique to the imaging lens other than the program.

Although a zoom range and the open F value of the imaging lens 500 are designed according to the intention of capturing, the imaging lens 600 which has a reflective optical system basically does not have a zoom lens or an imaging aperture control mechanism.

Figure 2:
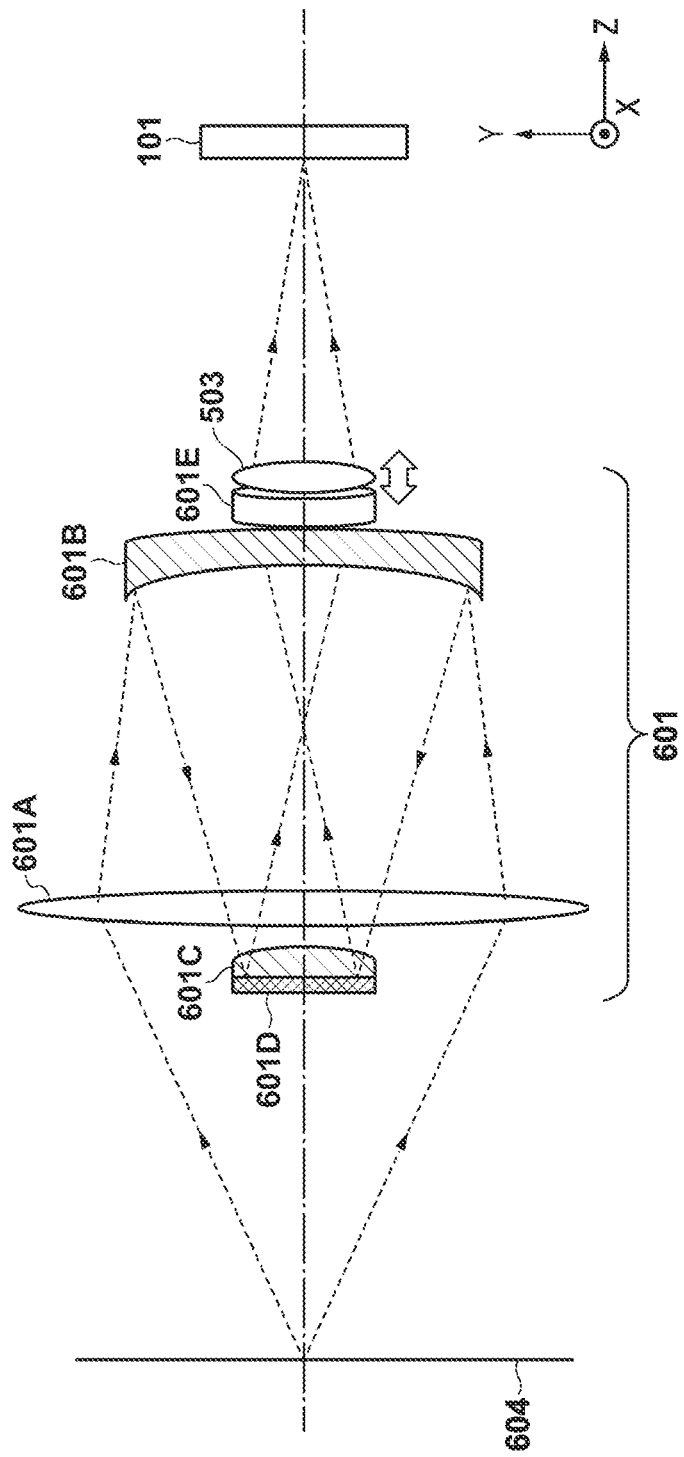
FIG. 2 is a configuration diagram of a reflective optical system.

Next, the reflective optical system in the first lens group 601 shown in FIG. 1A will be described with reference to FIG. 2. In FIG. 2, a left solid line indicates a subject 604, and dashed lines indicate light rays emitted from one point of the subject 604. Light emitted from the subject 604 is condensed through the lens 601A and reflected by the lens 601B.

Further, light reflected and refracted by the lens 601C passes through the lens 601B, passes through the lens 601E, passes through the previously-described focus lens 503, and is then formed on the image capturing surface of the image sensor 101. The lens 601B is a reflective lens that reflects and causes light to go backward in the optical path in FIG. 2. A light blocking portion 601D is attached to the lens 601C on a surface (the surface on the subject side) opposite to the optical path. In this manner, by folding the optical path within the lens, a lens having a long focal length while having a small outer shape can be realized.

Figure 3A:
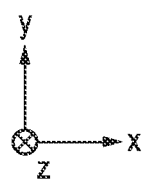
FIGS. 3A to 3C are diagrams for describing a pupil function.
Figure 3A:
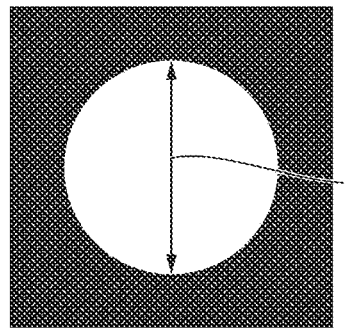
Figure 3B:
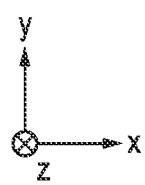
Figure 3B:
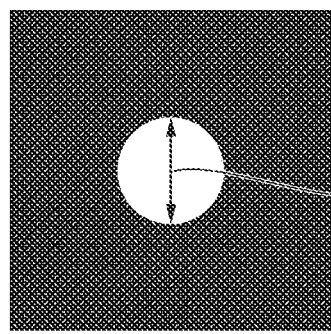
Figure 3C:
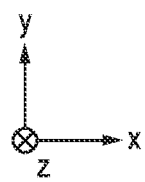
Figure 3C:
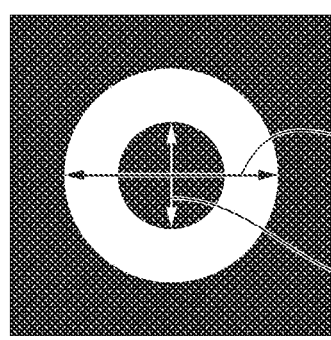

FIGS. 3A to 3C are diagrams for describing a pupil function showing the performance of the lens of the imaging optical system in the present embodiment. The pupil function is the light intensity distribution for an aperture surface at an exit pupil distance of the lens. The black portion in the figure shows a state in which light is blocked at an aperture ratio of 0%, and the white portion in the figure shows an aperture state at an aperture ratio of 100%. Assuming an ideal state in which there are no aberrations in the imaging lens and the aperture shape is an ideal circular shape, the aperture pupil shape (white part in FIG. 3A) becomes a perfect circular shape as shown in FIG. 3A.

Considering correspondence with a capturing F value, in a state where the F value is small (close to an open F value), the opening diameter D1 of the pupil function is large as shown in FIG. 3A, and where the F value is large (narrow state), the opening diameter D2 of the pupil function is small as shown in FIG. 3B. An exit pupil distance z is a lens-specific value, and when the capturing F value is decided, the magnitude of the diameter D of the opening on the exit pupil plane is uniquely decided. The aperture shape for the pupil function of the imaging lens 600 in the present embodiment is a donut shape as shown in FIG. 3C even in a state where there is no aberration because the light ray is blocked by the light blocking portion 601D. An outer side diameter and an inner side diameter in the donut-shaped opening of the pupil functions in FIG. 3C are denoted by outer diameter DG and inner diameter DN, respectively. The magnitudes of the outer diameter DG and the inner diameter DN are also values that are uniquely decided when the exit pupil distance of the imaging lens, the capturing F value, and the diameter of the light blocking portion 601D are decided.

Figure 4A:
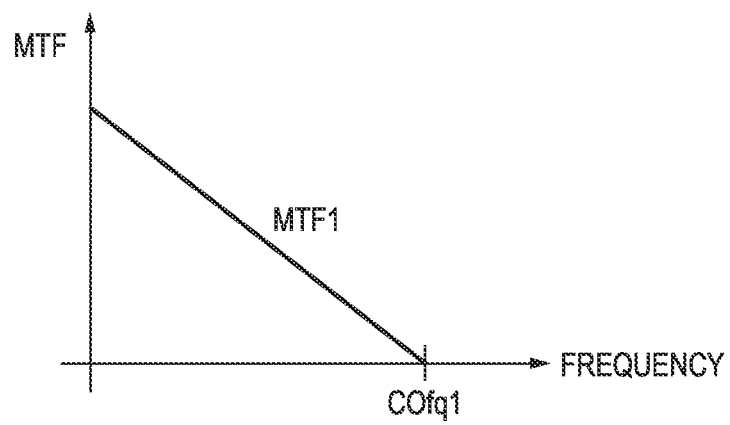
FIGS. 4A to 4C are diagrams for describing MTFs.
Figure 4B:
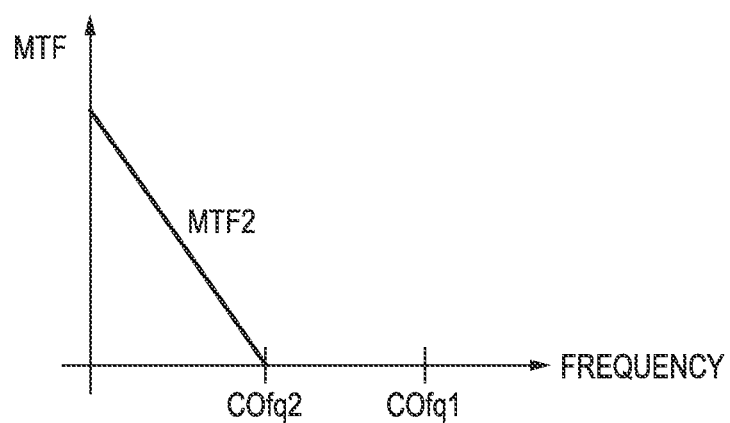
Figure 4C:
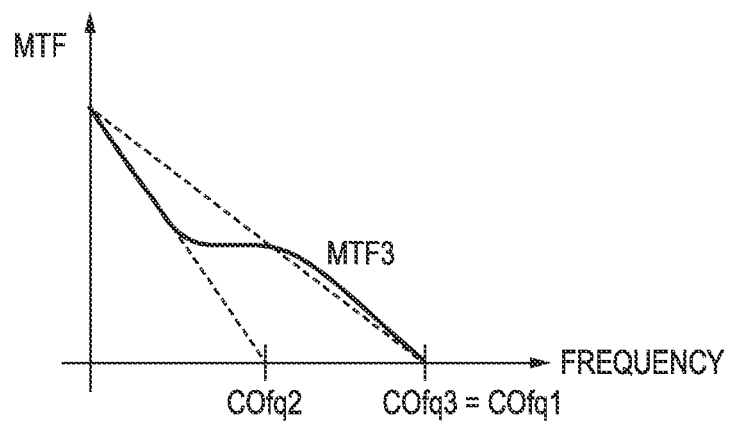

In this case, an MTF indicating the resolution of the imaging lens is represented by an absolute value of an OTF which is an autocorrelation of the pupil function. MTF characteristic diagrams respectively corresponding to the pupil functions in FIGS. 3A to 3C are shown in FIG. 4A to FIG. 4C. For aperture shapes such as shown in FIGS. 3A and 3B, which are generally circular pupil functions, the larger the opening diameter D, the higher the values of the MTFs, which are the vertical axes of FIGS. 4A to 4C. Large values on the vertical axis are synonymous with high resolution of the lens. Since the horizontal axis is frequency, a significant difference occurs in resolution in the high-frequency band between FIG. 4A and FIG. 4B. The frequency at which the MTFs fall to 0 (the resolution limit of the lens) is referred to as the cutoff frequency, and is indicated by COfq1 and COfq2 in FIG. 4A and FIG. 4B respectively. The cutoff frequency also differs depending on the size D of the opening, and is obtained by COfq=D/2λf (λ: wavelength of light, f: focal length of imaging optical system).

In the case where the pupil function has an ideal circular shape, the cutoff frequency is obtained by the above equation, but in an actual imaging optical system, the imaging aperture is often different from the circular shape, and also differs in accordance with image capturing conditions (aberration, coordinates x, y on the image capturing surface, and the like), and the MTF changes in a complicated manner. In addition, a donut-shaped pupil function of a lens having the reflective optical system in the present embodiment as in FIG. 3C exhibits an MTF characteristic diagram MTF3 as in FIG. 4C. The cutoff frequency COfq3 in FIG. 4C is equal to COfq1 when the outer diameter DG=D1. In other words, the cutoff frequency is a value decided by the magnitude of the outer diameter DG. In the low frequency region, as can be seen from an autocorrelation relation between the pupil function and the MTF, MTF3 approaches an MTF for an opening whose diameter is the difference between the outer diameter and the inner diameter (hereinafter referred to as the inner/outer diameter difference). That is, in FIG. 3C, when DG−DN=D2, MTF3 shown in FIG. 4C shows values close to MTF2 shown in FIG. 4B in the low frequency region (<COfq2). As described above, in the optical system of the present embodiment, although the pupil function has a special shape, since the magnitudes DG and DN of the outer diameter and the inner diameter on the exit pupil plane are values which are decided in accordance with design from the diameter and the open F value of the light blocking portion 601D shown in FIG. 2, the MTF, which is the lens performance, can also be predicted as in FIG. 4C.

Figure 5:
FIG. 5 is a diagram for describing the correspondence between a diameter and an F value of a reflective optical system.

If the imaging lens 600 and the camera body 100 are an integrated camera, an MTF which is calculated in advance may be held. On the other hand, in the interchangeable lens system, the imaging lens 600 holds in the nonvolatile memory 510 values of parameters appropriately selected from the magnitude DN of the inner diameter, the magnitude DG of the outer diameter, the pupil function P, the lens exit pupil distance LPO, the lens MTF, and the like. Then, information on the shape of the reflective optical system of the lens is communicated to the camera body 100 via lens-side communication terminal 508 and the camera-side communication terminal 113. Further, as shown in FIG. 5, information of the F value corresponding to the diameter may be communicated as a value instead of the magnitude DN of the inner diameter and the magnitude DG of the outer diameter. For example, information may be communicated by setting the magnitude of the outer diameter DG=F2 and the inner/outer diameter difference=F4. In addition, configuration may be taken such that some information in the interchangeable lens system is held in the nonvolatile memory 115 on the camera side, and only some information is communicated from the lens.

Figure 6B:
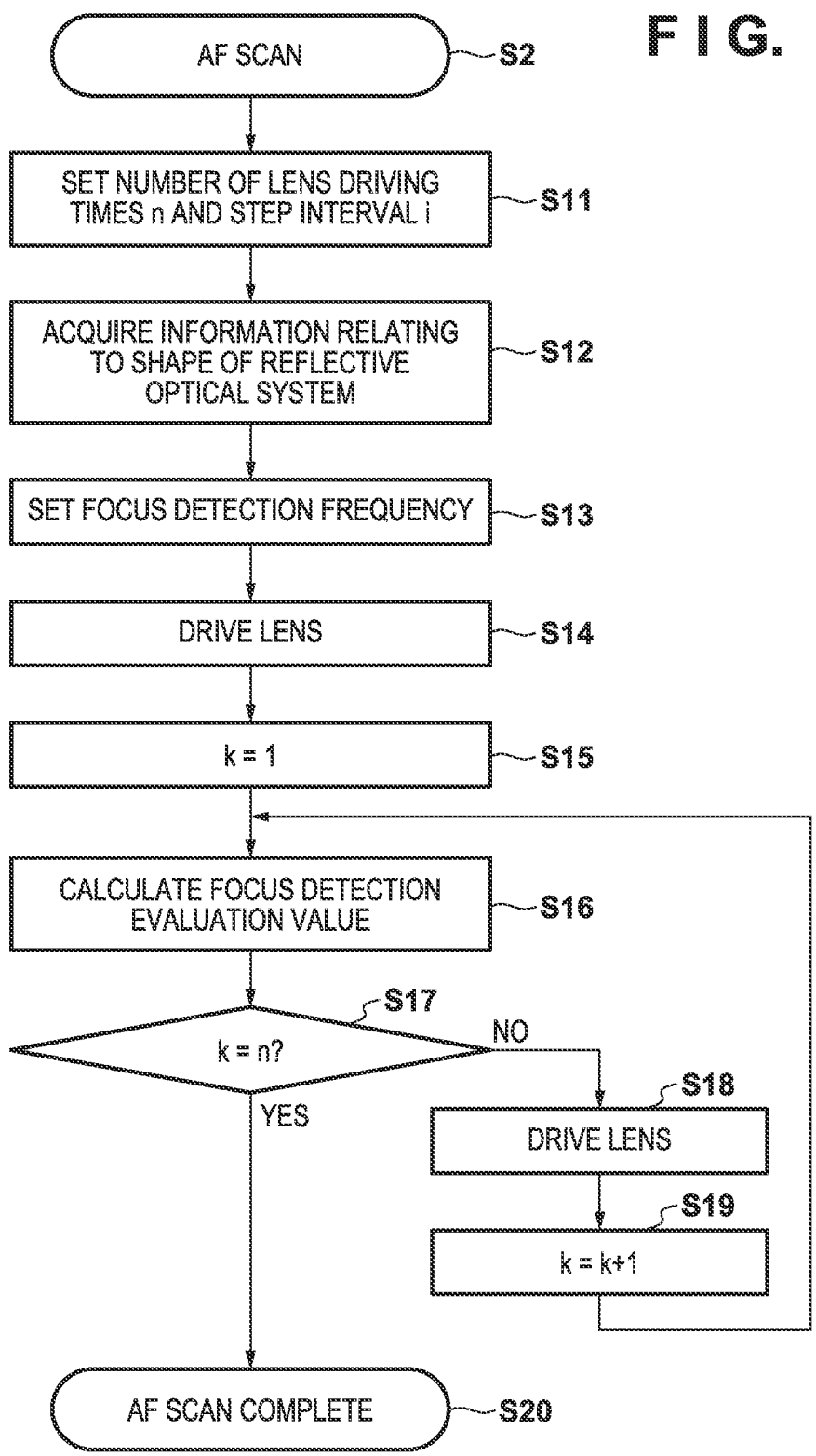

Next, the focus detection operation in the present embodiment will be described with reference to FIGS. 6A to 6C. In the present embodiment, the focus detection operation is generally performed by a technique called contrast AF (autofocus).

Figure 7:
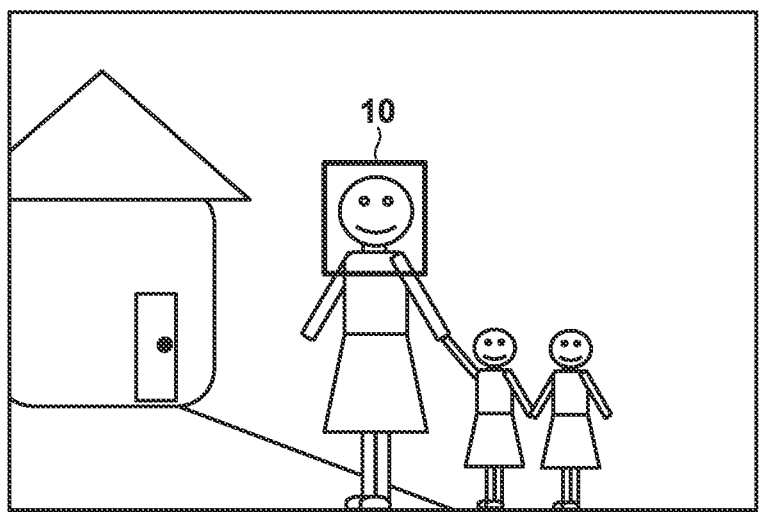
FIG. 7 is a view for describing a focus detection region.

First, in step S1 of FIG. 6A, a focus detection region is set. For example, when a captured image as shown in FIG. 7 is obtained by the camera CPU 104, a face in the vicinity of a screen center portion is detected as a main subject, and a focus detection region 10 is set. The size and position coordinates (x, y) of the focus detection region 10 may be arbitrarily set by a photographer, or may be automatically set by a face detection function or the like when a face is included in a captured image as shown in FIG. 7.

Next, in step S2, an AF scan operation is performed. In the AF scan operation, while the focus lens 503 is caused to move along the optical axis, a focus detection evaluation value indicating a degree of focus is calculated with a number of lens driving times n and a step interval i that are set in step S11. Here, the AF scan operation performed in step S2 will be described in detail with reference to the flowchart of FIG. 6B.

First, when the AF scan operation is started, the number of lens driving times n and the step interval i are set in step S11. In contrast AF, the focus evaluation value is acquired while the focus lens is caused to move in the optical axis direction, and the focus lens 503 is caused to stop when the focus evaluation value reaches a local maximum (contrast of the subject is a maximum), to thereby acquire an image that is in focus. Therefore, the number of times of driving n and the step interval i of the focus lens should be set within a range in which the local maximum value of the contrast can be obtained.

Figure 8:
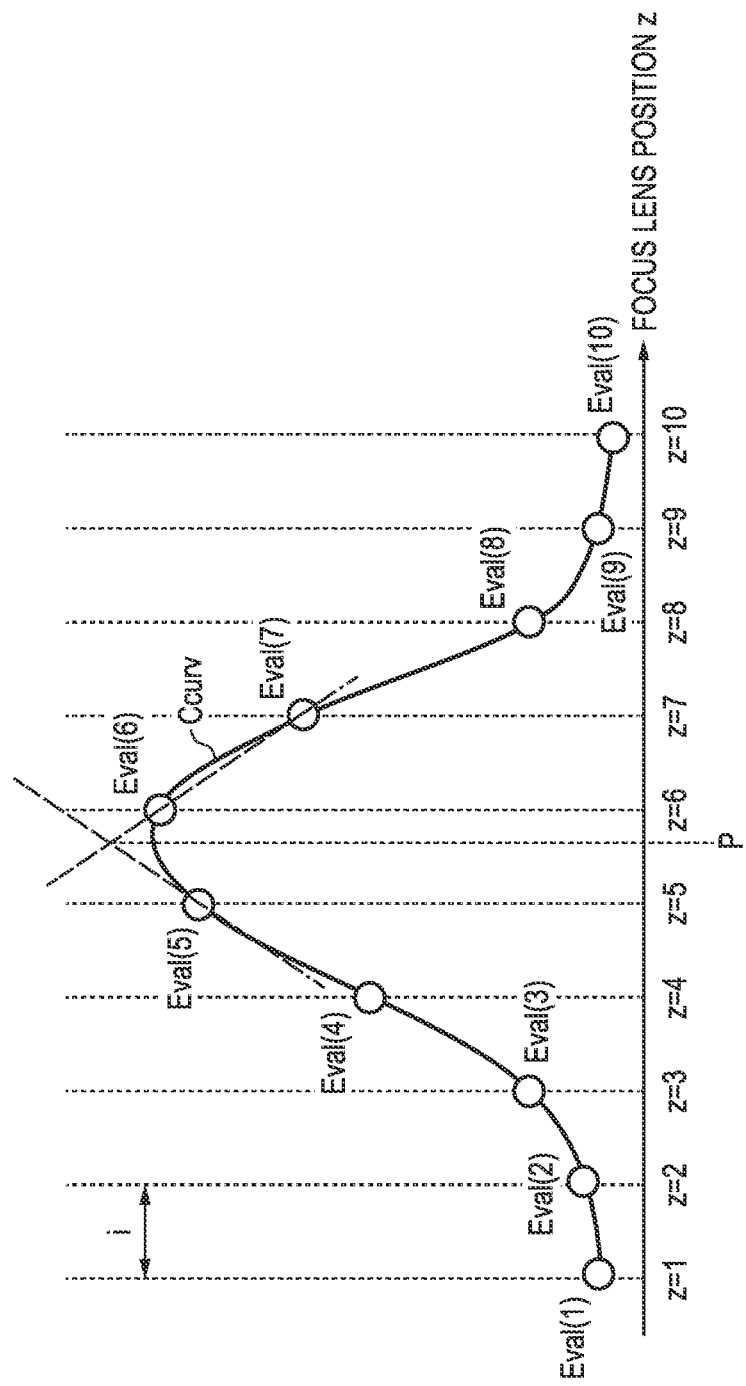
FIG. 8 is a view for describing a focus detection evaluation value.
Figure 9:
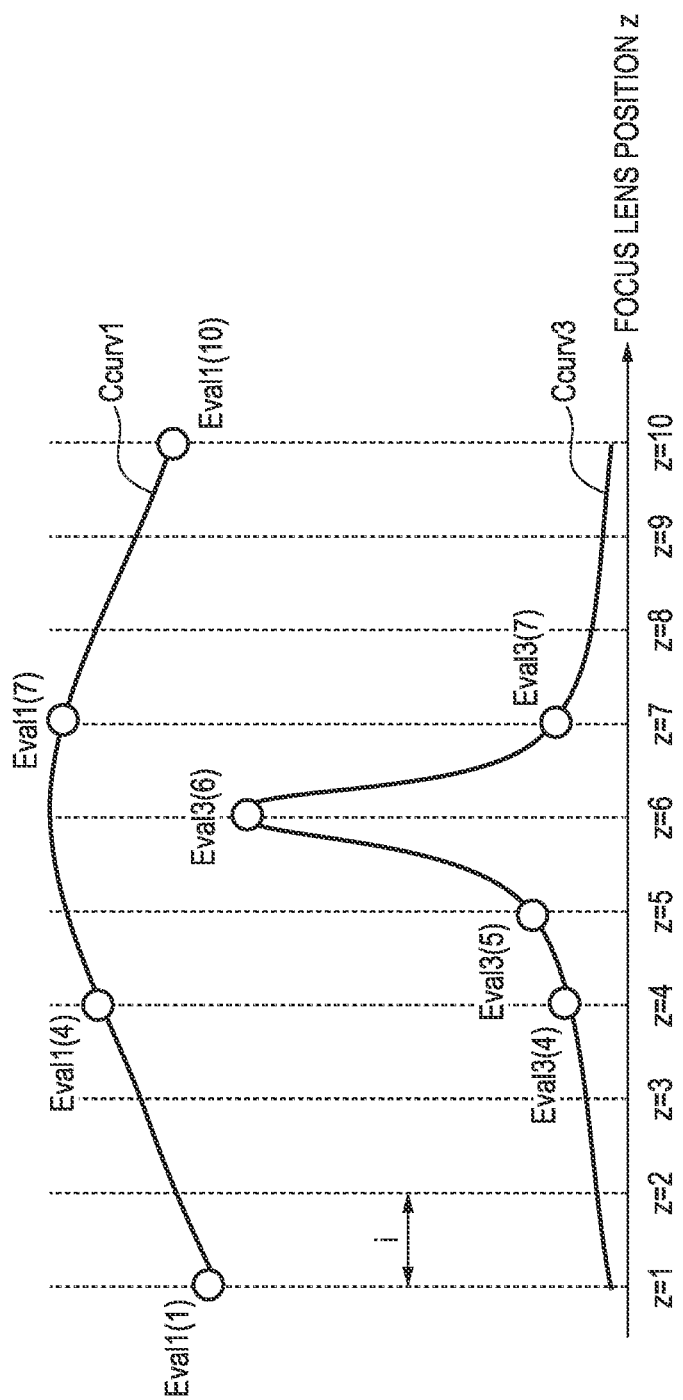
FIG. 9 is a diagram for describing a change in a focus detection evaluation value in accordance with a focus detection band.

For example, assume that, when the focus lens position z is caused to change as indicated by the horizontal axis in FIG. 8, the contrast curve Ccurv is acquired as with Ccurv in FIG. 8, and the focus evaluation values Eval(n) at the respective focus lens positions are obtained. In this case, the number of lens driving times and the step interval set in step S11 may be set with the number of lens driving times n=10 and the step interval=i, or the detection may be stopped with n=7 because it was possible to detect a local maximum value when the number of lens driving times n=7. A method such as the following is a well-known technique. First, as shown in FIG. 9, the local maximum position of an approximate focus evaluation value is found by first coarsely scanning with the number of lens driving times n=4 and a step interval 3i (between Eval1(4) and Eval1(7) on Ccurv1 in FIG. 9). Then, in order to detect the focal position with higher accuracy, the vicinity of the local maximum value is finely scanned with a step interval i (from Eval3(4) to Eval3(7) on Ccurv3 in FIG. 9), thereby obtaining a focal position equivalent to that in FIG. 8. These operations are hereinafter referred to as a coarse scan (coarse scan operation) and a fine scan (fine scan operation). In this instance, in FIG. 9, the number of lens driving times in the coarse scan is 4, the step interval is 3i, the number of lens driving times in the fine scan is 4, and the step interval is i. A method of calculating each focus evaluation value and a method of setting an appropriate contrast curve will be described later.

Next, in step S12, the camera CPU 104 acquires information on the shape of the reflective optical system according to the image capturing condition (zooming, focusing, F value, and image height) from the nonvolatile memory 510 of the imaging lens 600 or the nonvolatile memory 115 of the camera body 100. As described above, the content of the information is appropriately selected from the magnitude DN of the inner diameter, the magnitude DG of the outer diameter, the pupil function P, a lens exit pupil distance LPO, the lens MTF, information of the F value corresponding to the diameter, and the like. The camera CPU 104 acquires these pieces of information from the aforementioned nonvolatile memories 510 or 115, by communication with the imaging lens 600, or by communication within the camera body 100.

Figure 10:
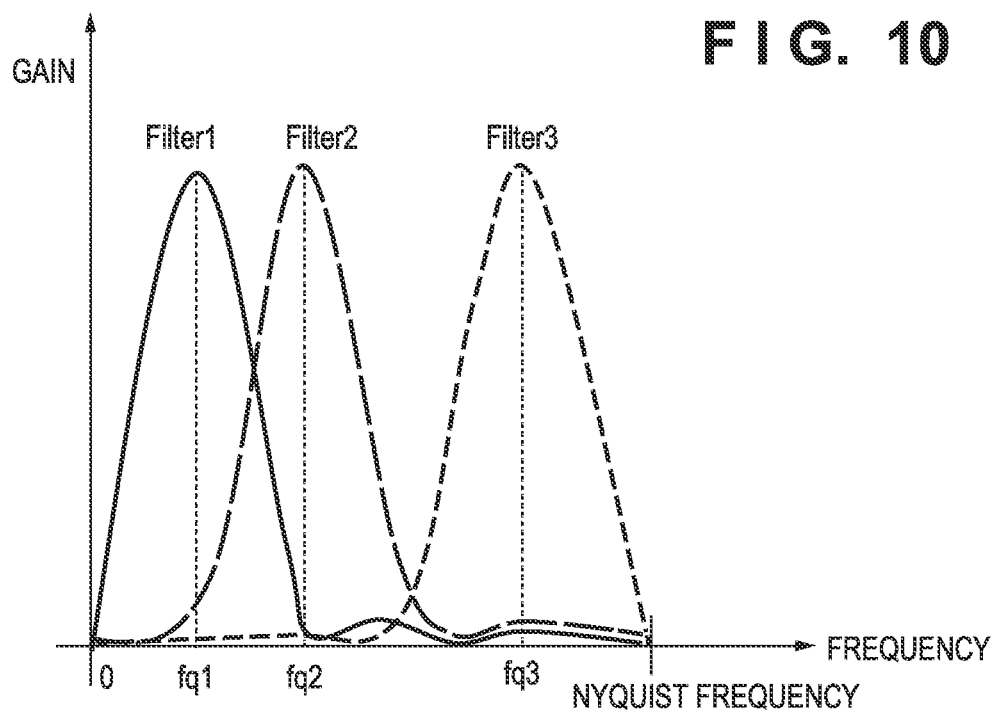
FIG. 10 is a diagram for describing a frequency band of a digital filter.

Next, in step S13, a focus detection frequency is set. Here, a focus detection frequency band of a digital filter is set. FIG. 10 is a diagram showing an example of the frequency band of the digital filter. The Nyquist frequency shown here is a value determined by the pixel pitch of the image sensor 101, and for example, if the pixel pitch of the image sensor 101 is 4 microns, the Nyquist frequency can be obtained as 1/(0.004×2)=125 (lp/mm: line pairs/millimeter)). This indicates that a subject image finer than 125 (lp/mm) cannot be resolved on the image sensor 101.

In FIG. 10, the horizontal axis represents the frequency, the vertical axis represents the gain, and Filter1 indicated by the solid line has a center frequency fq1. Filter2, Filter3 have higher frequency bands than Filter1, and their center frequencies are fq2 and fq3, respectively. In general, it is indicated that the higher the frequency band, the steeper the contrast evaluation value changes. Therefore, if the focus evaluation value obtained when the filter processing having a frequency characteristic such as Filter1 is performed is the contrast curve Ccurv1 in FIG. 9, the focus evaluation value obtained when the filter processing having a frequency characteristic such as Filter3 is performed becomes a contrast curve Ccurv3 that is sharper than the contrast curve Ccurv1. This is because the lens MTF of a high frequency component has a relatively higher amount of loss than the lens MTF of a low frequency component even with the same amount of blur (amount of driving of the focus lens).

In contrast AF focus detection, since the focus lens is generally driven when the focus evaluation value Eval reaches a local maximum, the shape of the contrast curve Ccurv also greatly affects the focus detection accuracy. For example, in FIG. 9, the focus lens position at which the focus evaluation value is a local maximum during the coarse scan is z=7, while the focus lens position at which the focus evaluation value is a local maximum during the fine scan is z=6. During the coarse scan, it is desirable that Ccurv1 of the contrast curve shows a gradual change because of the wide step interval. This is because, when performing focus detection with a sharp contrast curve Curv3 at the time of a coarse scan, there is a fear that a local maximum value may be missed due to a wide step interval. Therefore, in the case of a coarse scan, it is desirable that the focus detection frequency set in step S13 is in a low range. In contrast, in the case of a fine scan, since the step intervals are narrow, the use of a sharp curve such as the contrast curve Ccurv3 enables detection of a local maximum value of the focus detection evaluation value Eval with high accuracy. Accordingly, it is desirable that the focus detection frequency set in step S13 is in a high range.

Figure 11:
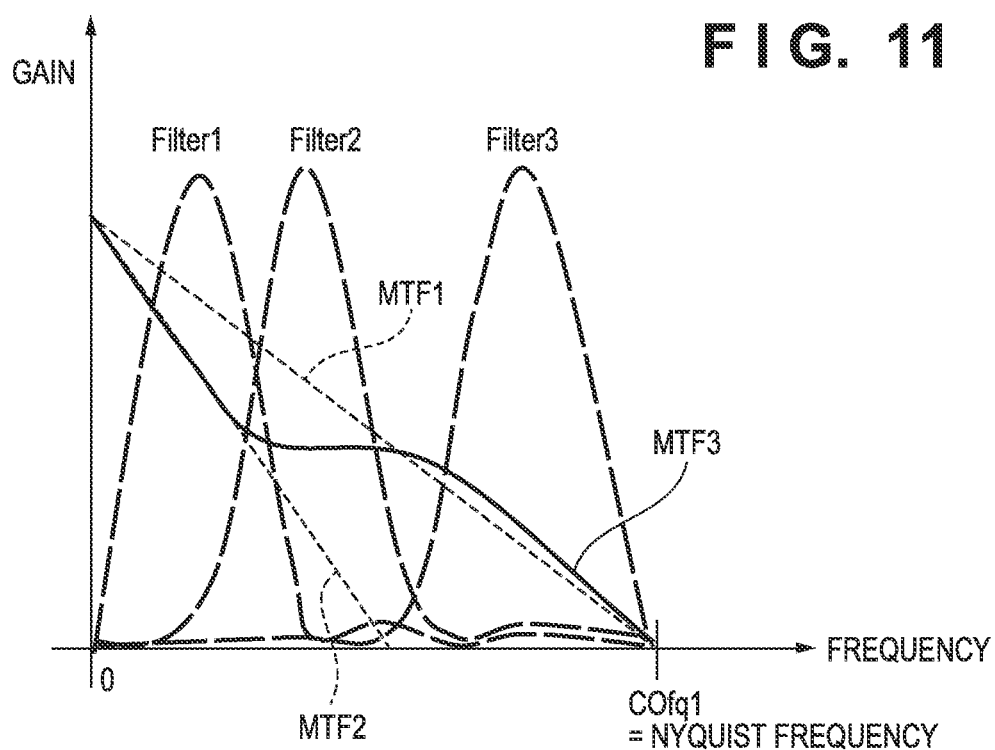
FIG. 11 is a diagram for describing correspondence between an MTF and a digital filter.

Further, the contrast curve Ccurv has values decided by multiplying the focus detection frequency by the MTF of the lens. The MTFs of the lens shown in FIGS. 4A to 4C and the focus detection frequencies shown in FIG. 10 are considered together. Now, assuming that the Nyquist frequency and the cutoff frequency of the lens are the same, it is possible to consider them together on a graph with the frequency on the horizontal axis and the gain on the vertical axis as shown in FIG. 11. In FIG. 11, the frequencies of Filter1, Filter2, and Filter3 are indicated by dashed-dotted lines, MTF1 and MTF2 are indicated by dashed lines, and MTF3 is indicated by a solid line. The MTFs shown here are MTFs of the focus lens position (for example, the focus lens position z=6) for which the focus evaluation value is a local maximum (in-focus state), and respective MTF characteristics are different in a defocus (not in focus) state. However, an MTF gain in the defocus state is lower than the MTF at a time of focus, and the value of the MTF generally gets relatively lower each time the defocus increases. At this time, the contrast evaluation value Eval (z=6) is close to a value proportional to a value resulting from multiplying the gain of the MTF and the gain of Filter.

Figure 12:
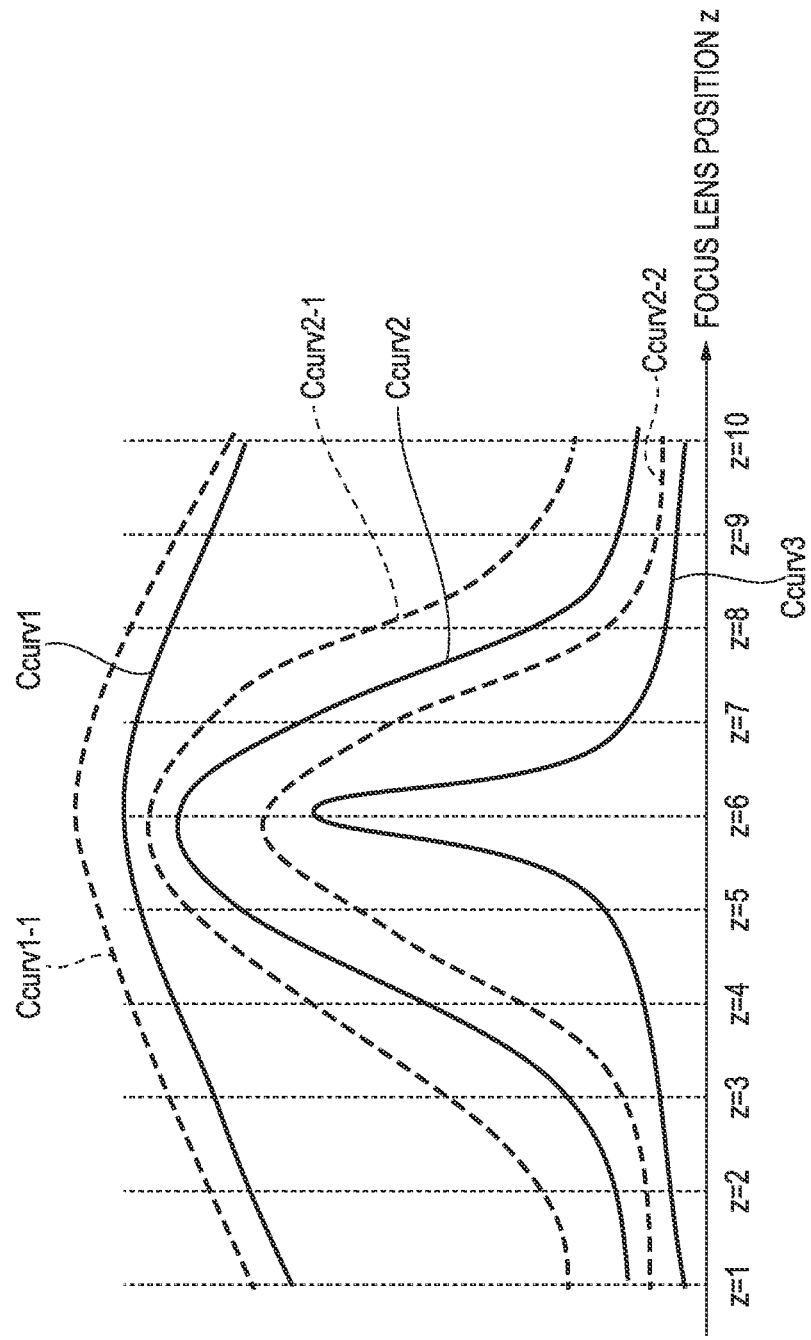
FIG. 12 is a diagram for describing a focus detection evaluation value at various MTF and focus detection bands.

That is, as shown in FIG. 12, the focus evaluation value Eval obtained by applying the digital filter Filter1 is almost unchanged between MTF2 and MTF3, and is Ccurv1. Since the output with MTF1 is higher than with MTF2 or MTF3, the focus evaluation value is also a large output as with Ccurv1-1. Similarly, the focus evaluation values Eval obtained by applying the digital filter Filter2 are respectively different, with Ccurv2-1 for MTF1, Ccurv2 for MTF2, and Ccurv2-2 for MTF3. The focus evaluation value Eval obtained by applying the digital filter Filter3 is Ccurv3 which hardly changes between MTF1 and MTF3, and a focus evaluation value is not obtained with MTF2 because the gain of the MTF is 0 (not shown).

Since the MTFs are known values in accordance with the configuration of the imaging optical system, when performing contrast AF, a desired contrast curve Ccurv can be obtained by appropriately setting the focus evaluation band of the digital filter in advance. At this time, in the case of a special imaging optical system such as a lens having the reflective optical system shown in the present embodiment, the focus detection frequency needs to be set in consideration of the fact that the MTF exhibits change such as with the shape of MTF3.

Figure 14:
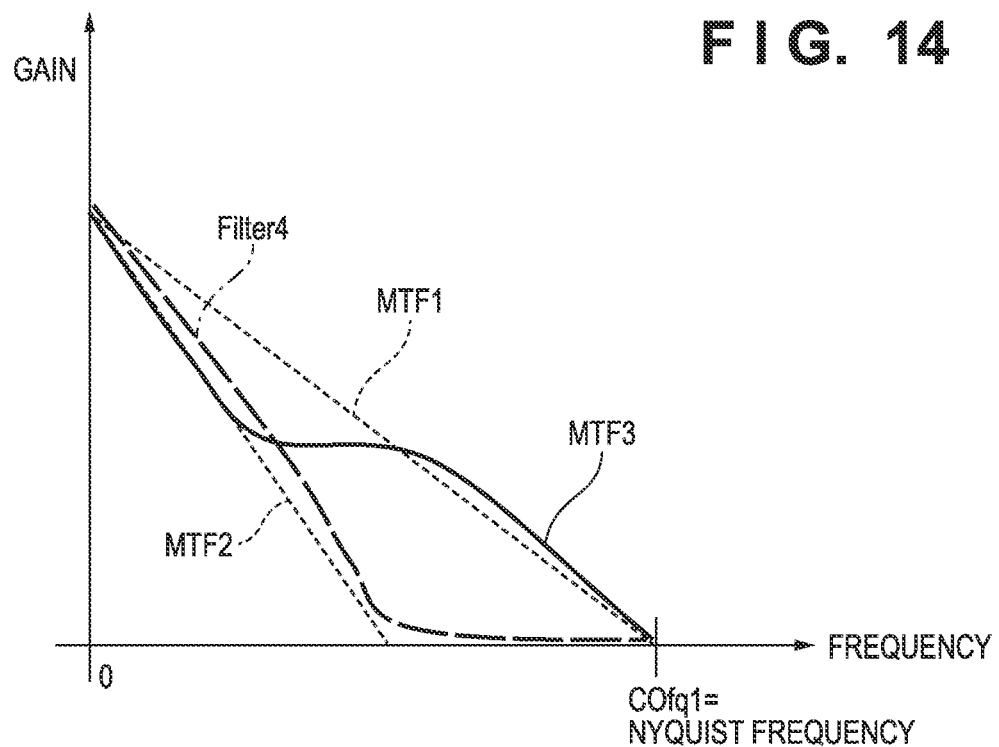
FIG. 14 is a diagram for describing a relationship between MTF and digital filter bands.

In an interchangeable lens system, in a case where the digital filter selected at a time of a coarse scan and a fine scan by the general imaging lens 500 is set as in the left column of FIG. 13 and if, for example, a capturing F value corresponding to the inner/outer diameter difference and the inner diameter of the imaging lens 600 having the reflective optical system of the present embodiment is communicated, an entry in the table shown by the thick frame of FIG. 13 is referred to. That is, it is sufficient to select the same Filter1 as for F4.0 corresponding to the inner/outer diameter difference F4 during a coarse scan, and select the same Filter3 as for F2.0 corresponding to the outer diameter difference F2 during a fine scan. As described above, in step S13, the signal processing method for a case of obtaining the focus evaluation value is switched in accordance with the information on the shape of the reflective optical system of the imaging lens 600. Here, the method of switching the digital filter has been described, but the step interval i may be set in accordance with information on the shape of the reflective optical system of the imaging lens 600. In addition, when low-pass Filter4 as shown in FIG. 14 is applied to MTF3 of the imaging lens 600, the characteristic becomes the same as that of MTF2, and therefore, it can be treated as the same characteristic as that of F4.0 of a normal lens.

Next, in step S14, the focus lens 503 is driven along the optical axis by a movement interval of one step of an AF scan. In step S15, a variable k indicating the number of times the focus lens 503 has been driven is set to 1.

Figure 15:
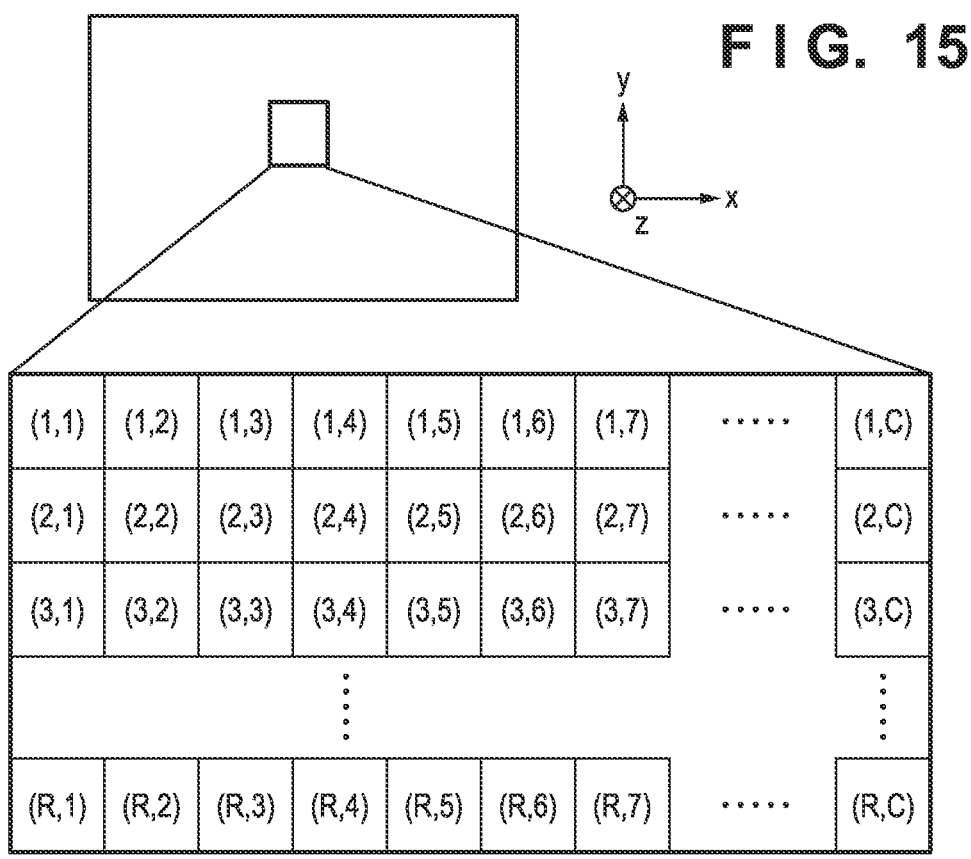
FIG. 15 is a diagram for describing a pixel signal for a focus detection region.

Next, in step S16, a focus evaluation value Eval is calculated. Here, the focus evaluation values Eval at the respective focus lens positions z are obtained by performing, for example, a convolution operation of the digital filters shown in step S13 with respect to the focus detection region set in step S1. For example, if Filter1 set in step S13 has the filter taps of (TAP1, TAP2, TAP3) and the pixel values gaso(x, y) in the focus detection region are in the array shown in FIG. 15, a pixel array value f(x, y) after the digital filter calculation can be obtained by:

$$f(x,y)=TAP1 \times gaso(x,y)+TAP2 \times gaso(x+1,y+1)+TAP3 \times gaso(x+2,y+2)$$

The number of taps (here, 3) (TAP1, TAP2, TAP3) may be set in accordance with the focus detection frequency described above in step S13. For example, the focus detection evaluation value Eval is obtained by calculating the largest absolute value among the pixel values of f(x, y) after the filter operation.

The method of calculating the focus evaluation value described here is an example, and the digital filter may be two-dimensional, and the focus evaluation value for each line may be obtained. Further, the focus evaluation value Eval may be obtained by performing a Fourier transform or the like of the image signal and then applying the digital filter gain of FIG. 10, and the method is not relevant as long as the focus evaluation value Eval indicating contrast in the image can be indicated. In addition, the band setting of the digital filter may be performed in conjunction with change of the recording frequency, depending on an addition state of the image signal (for a still image, for a live view display, for a moving image, and so on).

Next, in step S17, it is determined whether or not the variable k has reached the number of lens driving times n set in step S11. If the variable k has reached the number of lens driving times n, the processing proceeds to step S20 to end the AF scan operation, and if not, the processing proceeds to step S18 where the focus lens 503 is driven by one step of the AF scan.

In step S19, the variable k is incremented, and the processing returns to step S16. Then, the operations of step S16 to step S18 are repeated until the variable k becomes equal to the number of lens driving times n set in step S11.

As described above, when the AF scan is divided into a coarse scan and a fine scan, the operations of step S13 to step S19 are performed twice: once for the coarse scan and once for the fine scan.

Returning to the description of FIG. 6A, in step S3, the peak position calculation is performed from the focus evaluation values Eval obtained in step S16. When focus evaluation values Eval as shown in FIG. 8 are obtained, the focus lens position z=6 may be set as the focus evaluation value peak position (in-focus position) with Eval(6) which is the local maximum value as the focus evaluation value peak. However, for higher accuracy, a focus lens position P, which is a peak position of the focus evaluation value equivalent to performing an interpolation calculation using the focus evaluation value Eval in the vicinity of the local maximum value of the focus evaluation value, the step intervals, and the focus lens position z is obtained. A method of calculating the interpolation may be by linear interpolation, or a local maximum value may be obtained by high-order approximation from the obtained discrete focus evaluation value Eval.

In the example of FIG. 8, an interpolation calculation is performed by linear interpolation using three points in the vicinity of the local maximum value, and it is calculated that there is a local maximum value between the focus lens positions z=5 and z=6, and the focus lens position P is in the vicinity of z=5.7.

Next, in step S4, focus determination (in-focus state determination) of the peak position of each focus detection region is performed, and the process proceeds to step S5. Here, the presence or absence of the local maximum value of the AF evaluation value with respect to the focus lens position is determined, and the focus lens position in the case where a local maximum value is present is calculated. Further, the reliability of a change curve of the AF evaluation value in the vicinity of the local maximum value is evaluated. In this reliability evaluation, it is determined whether the obtained AF evaluation value has taken a local maximum value because the optical image of the subject is formed on the image sensor 101 or has taken a local maximum value due to other external disturbance.

As a detailed method of focus determination, for example, a method as described in FIG. 10 to FIG. 13 of Japanese Patent Laid-Open No. 2010-078810 may be used. That is, whether or not the AF evaluation value indicating the in-focus state is mountain-shaped is determined based on the difference between the largest value and the smallest value of the focus evaluation value, the length of a portion inclined at an inclination equal to or more than a predetermined value (SlopeThr), and the gradient of the inclined portion. By this, it is possible to perform focus determination. If the focus determination is not good, the in-focus indication in step S6 is displayed as out-of-focus, or the AF scan operation of step S2 is redone.

Next, in step S5, the focus lens 503 is driven in the optical axis direction to the focus lens position P obtained in step S3.

Finally, in step S6, an in-focus indication is made. When the focus determination is OK in step S4, an in-focus indication (for example, a green box is displayed) is made in the focus detection region of FIG. 7 to inform a user of the end of the focus detection operation. When the focus determination is OK in step S4, an out-of-focus indication (for example, a red box is displayed) is made in the focus detection region of FIG. 7 to inform a user of the end of the focus detection operation. The above operation is performed and the focus adjustment operation completes.

As described above, according to the present embodiment, focus adjustment can be performed with high accuracy even in an image capturing apparatus having a lens that includes a reflective optical system.

Other Embodiments

Embodiment(s) of the present invention can also be realized by a computer of a system or apparatus that reads out and executes computer executable instructions (e.g., one or more programs) recorded on a storage medium (which may also be referred to more fully as a'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image capturing apparatus, comprising:
an image sensor configured to capture a subject image; and
at least one processor or circuit configured to function as a focus detection unit configured to, based on an image signal obtained by photoelectrically converting the subject image in accordance with the image sensor while performing a scan operation that causes a focus lens included in an imaging optical system to move along an optical axis of the imaging optical system, calculate a focus evaluation value indicating a degree of focus of a subject and detect a position of the focus lens at which the focus evaluation value is a maximum,
wherein the focus detection unit, in a case where the imaging optical system includes a reflective optical system in which a part of a light beam is blocked, sets a calculation method of the focus evaluation value or a control method of the focus lens during the scan operation based on information relating to a shape of the reflective optical system, and
wherein the information relating to the shape of the reflective optical system includes information relating to an inner diameter and an outer diameter of an opening of a doughnut shape corresponding to a pupil function on an exit pupil plane of the reflective optical system.

2. The image capturing apparatus according to claim 1, wherein the information relating to the shape of the reflective optical system includes information of F number corresponding to the inner diameter and the outer diameter of the opening of the doughnut shape.

3. The image capturing apparatus according to claim 1, wherein the information relating to the shape of the reflective optical system includes information relating to an MTF of the reflective optical system.

4. The image capturing apparatus according to claim 1, wherein the focus detection unit sets a focus detection frequency for calculating the focus evaluation value based on the information relating to the shape of the reflective optical system.

5. The image capturing apparatus according to claim 1, wherein the focus detection unit calculates the focus evaluation value by performing a coarse scan operation in which one step of moving interval of the focus lens is a first interval and a fine scan operation in which one step of moving interval of the focus lens is smaller than the first interval as the scan operation of the focus lens.

6. The image capturing apparatus according to claim 5, wherein the focus detection unit more finely calculates the position of the focus lens at which the focus evaluation value is a maximum by the fine scan operation based on a maximum value of the focus evaluation value obtained by the coarse scan operation.

7. The image capturing apparatus according to claim 5, wherein the focus detection unit sets a focus detection frequency used in a coarse scan operation for a lens that has an opening corresponding to an inner diameter of an opening of a doughnut shape corresponding to a pupil function on an exit pupil plane of the reflective optical system as a focus detection frequency of a coarse scan operation for the imaging optical system and sets a focus detection frequency used in a fine scan operation for a lens that has an opening corresponding to an outer diameter of the opening of the doughnut shape as a focus detection frequency of a fine scan operation for the imaging optical system.

8. The image capturing apparatus according to claim 1, wherein the focus detection unit sets one step of moving interval of the focus lens in the scan operation based on the information relating to a shape of the reflective optical system.

9. The image capturing apparatus according to claim 1, wherein the focus detection unit calculates the focus evaluation value by applying a filter corresponding to an MTF characteristic of a lens that has an opening corresponding to an inner diameter of an opening of a doughnut shape corresponding to a pupil function on an exit pupil plane of the reflective optical system.

10. A method of controlling an image capturing apparatus having an image sensor configured to capture a subject image, the method comprising:
based on an image signal obtained by photoelectrically converting the subject image in accordance with the image sensor while performing a scan operation that causes a focus lens included in an imaging optical system to move along an optical axis of the imaging optical system, calculating a focus evaluation value indicating a degree of focus of a subject and detecting a position of the focus lens at which the focus evaluation value is a maximum,
wherein in the detecting, in a case where the imaging optical system includes a reflective optical system in which a part of a light beam is blocked, a calculation method of the focus evaluation value or a control method of the focus lens during the scan operation is set based on information relating to a shape of the reflective optical system, and
wherein the information relating to the shape of the reflective optical system includes information relating to an inner diameter and an outer diameter of an opening of a doughnut shape corresponding to a pupil function on an exit pupil plane of the reflective optical system.

11. A non-transitory computer readable storage medium storing a program for causing a computer to execute a method of controlling an image capturing apparatus having an image sensor configured to capture a subject image, the method comprising:
based on an image signal obtained by photoelectrically converting the subject image in accordance with the image sensor while performing a scan operation that causes a focus lens included in an imaging optical system to move along an optical axis of the imaging optical system, calculating a focus evaluation value indicating a degree of focus of a subject and detecting a position of the focus lens at which the focus evaluation value is a maximum,
wherein in the detecting, in a case where the imaging optical system includes a reflective optical system in which a part of a light beam is blocked, a calculation method of the focus evaluation value or a control method of the focus lens during the scan operation is set based on information relating to a shape of the reflective optical system, and
wherein the information relating to the shape of the reflective optical system includes information relating to an inner diameter and an outer diameter of an opening of a doughnut shape corresponding to a pupil function on an exit pupil plane of the reflective optical system.

12. A camera system in which an imaging lens is interchangeably mounted with respect to a camera body,
wherein the imaging lens includes:
a focus lens;
a reflective optical system in which a part of a light beam is blocked;
a storage device configured to store information relating to a shape of the reflective optical system; and
a transmission circuit configured to transmit the information relating to the shape of the reflective optical system to the camera body, and
wherein the camera body includes:
an image sensor configured to capture a subject image; and
at least one processor or circuit configured to function as
a focus detection unit configured to, based on an image signal obtained by photoelectrically converting the subject image in accordance with the image sensor while performing a scan operation that causes a focus lens included in an imaging optical system to move along an optical axis of the imaging optical system, calculate a focus evaluation value indicating a degree of focus of a subject and detect a position of the focus lens at which the focus evaluation value is a maximum;
a receiving unit configured to receive the information related to the shape of the reflective optical system from the imaging lens; and
a control unit configured to set a calculation method of the focus evaluation value or a control method of the focus lens during the scan operation based on the information relating to the shape of the reflective optical system,
wherein the information relating to the shape of the reflective optical system includes information relating to an inner diameter and an outer diameter of an opening of a doughnut shape corresponding to a pupil function on an exit pupil plane of the reflective optical system.

13. An imaging lens that is interchangeably mounted with respect to a camera body, comprising:
a focus lens;
a reflective optical system in which a part of a light beam is blocked;
a storage device configured to store information relating to a shape of the reflective optical system; and
a transmission circuit configured to transmit the information relating to the shape of the reflective optical system to the camera body,
wherein the information relating to the shape of the reflective optical system includes information relating to an inner diameter and an outer diameter of an opening of a doughnut shape corresponding to a pupil function on an exit pupil plane of the reflective optical system.

14. The imaging lens according to claim 13, wherein the information relating to the inner diameter and the outer diameter of the opening of the doughnut shape includes a size of the inner diameter and a size of the outer diameter.

15. The imaging lens according to claim 13, wherein the information relating to the inner diameter and the outer diameter of the opening of the doughnut shape includes information of F number corresponding to the inner diameter and the outer diameter.

16. The imaging lens according to claim 13, wherein the transmission circuit transmits at least one of the pupil function P, an exit pupil distance LPO and an MTF to the camera body.

* * * * *